April 30, 1940.  J. C. PETERS  2,199,082
RADIATION PYROMETRY
Filed Oct. 22, 1938  2 Sheets-Sheet 2
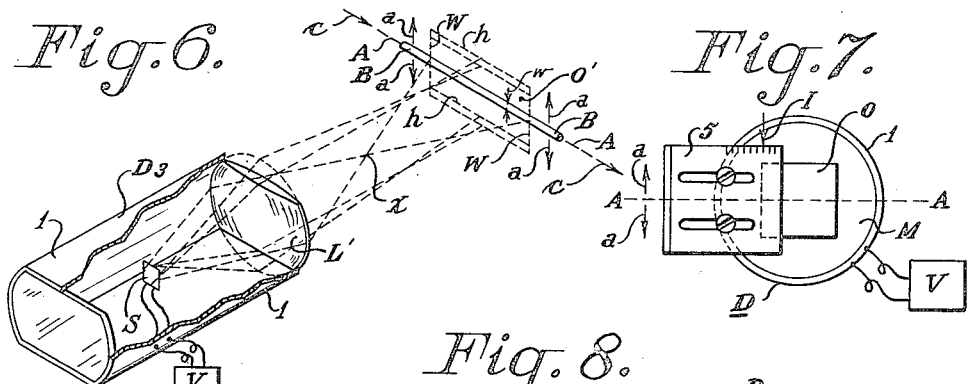
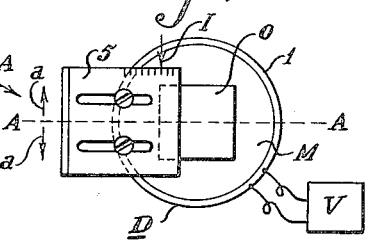
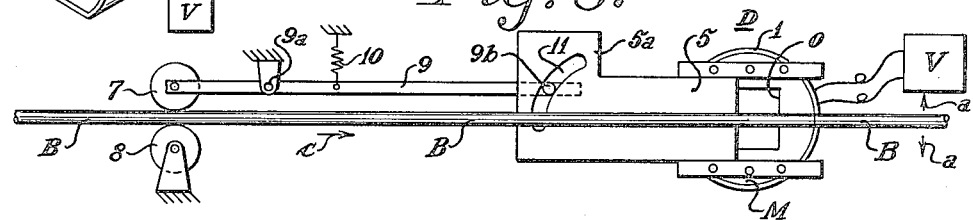
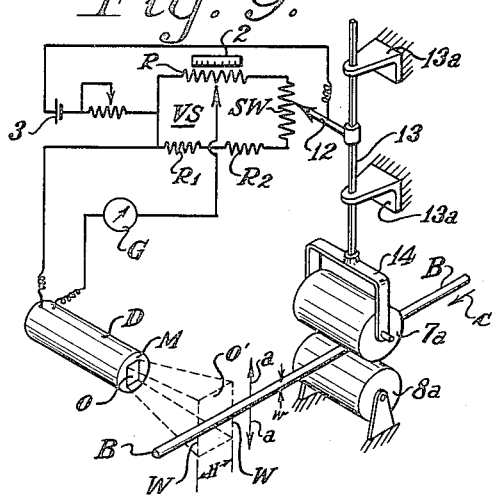
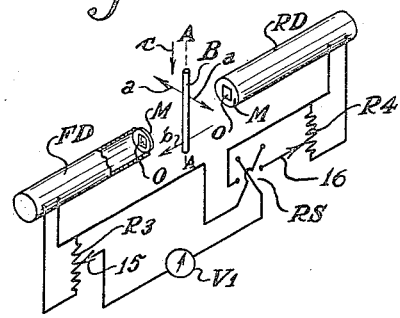
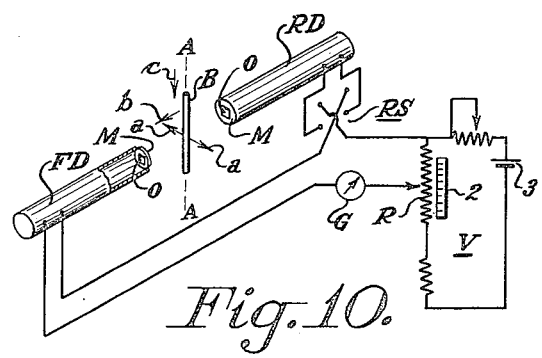
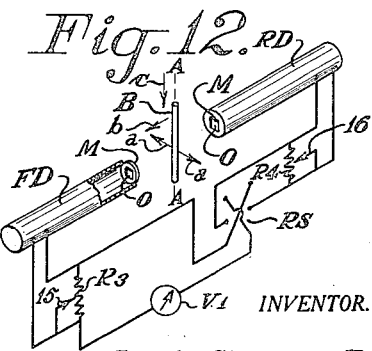
INVENTOR.
Jacob Clarence Peters
ATTORNEY.

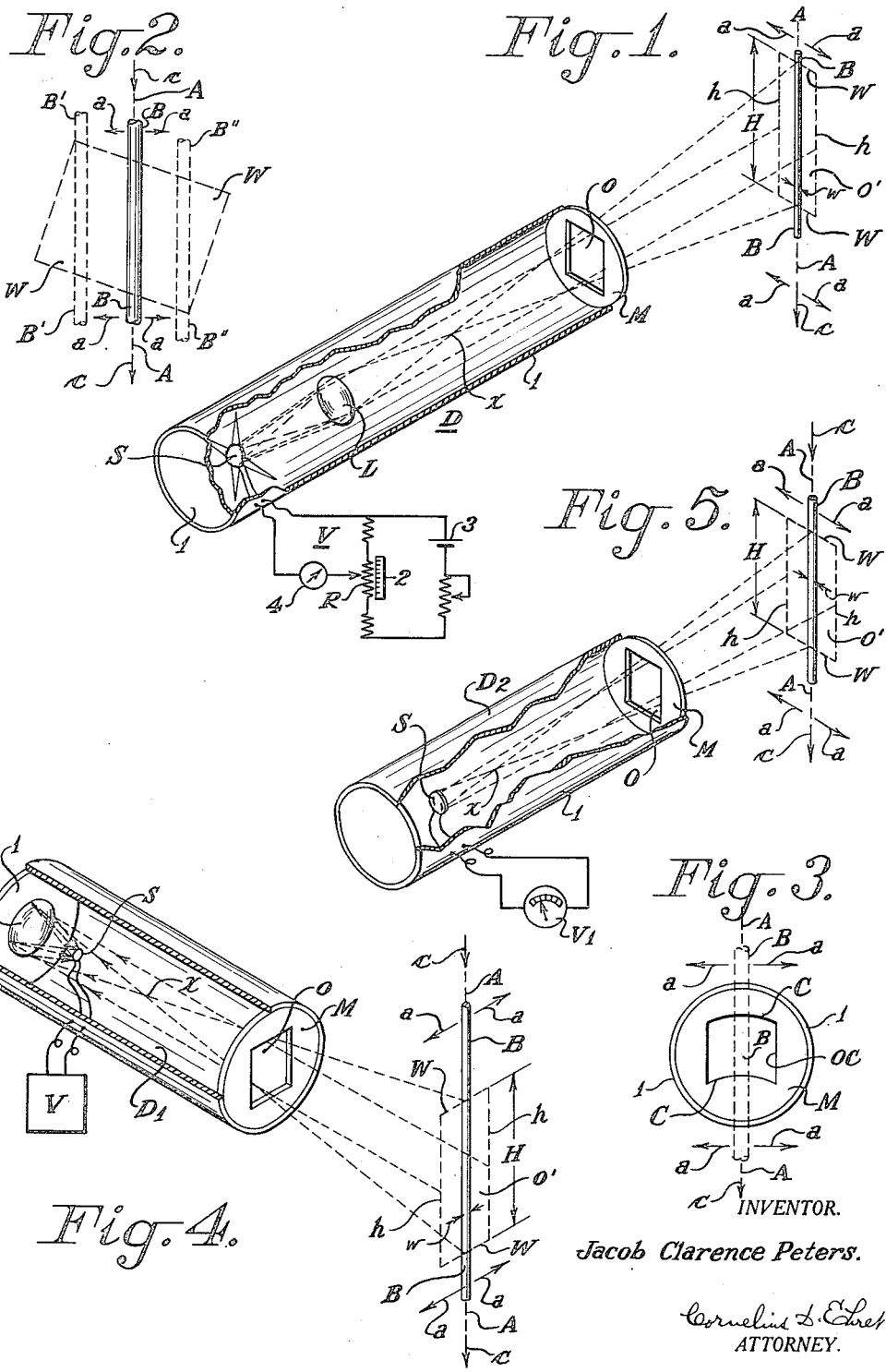

Patented Apr. 30, 1940

2,199,082

UNITED STATES PATENT OFFICE 2,199,082

RADIATION PYROMETRY

Jacob Clarence Peters, Jenkintown, Pa., assignor to Leeds & Northrup Company, Philadelphia, Pa., a corporation of Pennsylvania Application October 22, 1938, Serial No. 236,424

8 Claims. (Cl. 73—355)

My invention relates to apparatus for determining the temperature of rods, bars, or the like, of steel, iron, or other metal or material, as during rolling, drawing or other mode of formation thereof by measurement of radiation therefrom.

Heretofore, in radiation pyrometry, it has been the practice so to design and construct a radiation pyrometer detector that the field of view of its radiation-receiving surface, such as a thermocouple target or sensitized surface of a photoelectric cell, does not extend beyond the surface of the heated body whose temperature is being measured. Radiation pyrometers so constructed are not suited for measurement of the temperatures of rods, bars, or the like, of small diameter or width and particularly rods or bars moving or vibrating transversely of their longitudinal axes during, for example, their movement longitudinally in the process of forming them while at high or radiant temperature, as by rolling, drawing, or the like.

In accordance with my invention, the field of view of the radiation-responsive surface as defined by the optical system has two sides whose corresponding increments of length are parallel to maintain constant, for any particular rod width, the longitudinal extent of rod visible to said surface throughout transverse movement of the rod, and the other sides thereof are spaced a distance greater than the extent of the field swept over by the rod in its transverse movement.

Further in accordance with my invention, to compensate for the different widths of different rods or bars, or the variations in width of successively viewed longitudinal increments of the same bar or rod, the length of rod included in the field of view of said radiation-responsive surface is varied automatically or manually in inverse ratio to the changes in rod width; alternatively, the length of rod viewed may be maintained constant irrespective of differences in width or diameter and compensation for the differences in width effected by introducing into or producing in an electric measuring circuit or network influenced by the radiation received from the rod or bar, a compensating or corrective electrical effect.

Further in accordance with my invention, a bar or rod may be simultaneously viewed from different positions or from opposite sides thereof by radiation pyrometers constructed as aforesaid in accordance with my invention in order that, notwithstanding its transverse movement or vibration, as in more than one plane, the resultant of the detector outputs is, to high degree of accuracy, representative of the rod or bar temperature.

My invention further resides in the apparatus having the features hereinafter described and claimed.

For an understanding of my invention, reference is had to the accompanying drawings, in which:

Fig. 1 diagrammatically and in perspective, with parts broken away, shows a radiation pyrometer system comprising one of the types of detector in accordance with my invention;

Fig. 2 is explanatory of Fig. 1 and other figures;

Fig. 3 is an end elevational view of a radiation-pyrometer detector;

Figs. 4, 5 and 6 diagrammatically and in perspective, with parts broken away, show radiation pyrometer systems comprising various types of detectors;

Fig. 7 is a front end view of a radiation-pyrometer detector having a shutter for varying its aperture;

Fig. 8 diagrammatically illustrates an arrangement for varying the shutter of Fig. 8 automatically to compensate for difference in width of the rod, bar, or other work under observation;

Fig. 9 diagrammatically and in perspective discloses an arrangement alternative to that of Fig. 8;

Figs. 10, 11 and 12 diagrammatically and in perspective illustrate alternative arrangements suited for measurement of the temperature of a bar or rod subject to movement in more than one plane transverse to its longitudinal axis.

Referring to Fig. 1, in the housing 1 of the radiation detector D are disposed the radiation-receiving surface S (which, in the particular instrument shown, is the target thermally conductively associated with the hot junctions of a plurality of thermocouples) lens L, and the stop or diaphragm M. The surface S is of such size and so positioned that its image, viewed from any point in lens L, is sufficiently large completely to fill the aperture O which is of such shape, rectangular for simplicity, that the area O', in a plane including axis A—A of the bar or rod B and within the solid angle defined by aperture O from point X has sides W, W, whose corresponding increments of length are parallel so to maintain constant the longitudinal extent of rod B visible to surface S as the rod moves or vibrates, in the direction indicated by arrows a, a, transversely of its axis A—A and while moving axially or longitudinally in the direction of arrow c. The width of the aperture O is such that the distance between sides *h, h* of area O' is substantially greater than the width or diameter of rod B so that throughout the aforesaid transverse movement or vibration of rod B, its entire width is always visible from all points on lens L and therefore radiates to receiving surface S. Because sides W, W of area O' are equidistant throughout their lengths as measured in direction parallel to the axis A—A of the rod, the surface S receives radiation from a constant length of rod throughout its aforesaid transverse movement or vibration which would not be true if aperture O were, for example, circular, and because, in addition, the sides *h, h* of the area are beyond the limits of transverse movement of the rod, the surface S receives radiation from a constant area of the rod; i. e., its full ever visible width *w* multiplied by the constant length H of its visible length.

The thermocouple voltage, whose magnitude is a function of the amount of radiation received by or impressed upon surface S, may be measured in any desired manner, for example, by a millivoltmeter VI, whose scale is preferably calibrated in degrees for direct readings of temperature, Fig. 5, or more preferably by a potentiometer network V such as shown in simplified form in Fig. 1.

In Fig. 1, slidewire R of the network V is provided with a temperature scale 2 calibrated to match the thermocouple characteristic for a particular standard magnitude of current through R from a suitable source of current, such as battery 3.

To determine the temperature of a rod B, for example, the slidewire contact is adjusted relative to the slidewire R until the thermocouple voltage is balanced, as indicated by null response of galvanometer 4, or equivalent, by the effective slidewire voltage; balance may be effected manually or automatically by mechanisms such as disclosed in patents to Squibb #1,935,732 or Williams #2,113,164.

When a Weston "Photronic," copper copper-oxide, or other voltage-generating type of photoelectric cell is used instead of thermocouples, the output voltage may be measured by a potentiometer or a sensitive deflection instrument. If the photo-electric cell is of the resistance variation type, for example, a selenium cell, other known and appropriate methods suited to interpret the changes of resistance in terms of temperature changes may be used.

The detector construction more or less diagrammatically shown in Fig. 1 is to be understood to be generically representative of both fixed focus and adjustable focus instruments.

To procure suitably high sensitivity without need to use an amplifier or complicated construction of detector D, the aperture O may be of such dimensions that the length H of area O' is a number of times greater than the width *w* of the bar or rod B.

To obtain the aforesaid relations insuring accurate determination of the temperature of the rod B, notwithstanding its transverse displacement or movement during its axial or longitudinal movement, it is not necessary that the sides W, W be at right angles to the axis AA of the bar B. For example, the detector housing I may be so oriented, the sides W, W of area O' are at a substantial angle to the axis AA of bar B as in Fig. 2, and yet the area of the bar visible to surface S is constant throughout the range of transverse movement of the bar indicated by the limiting positions B', B" thereof. However, changing aforesaid angle varies the effective length H of the aperture; i. e., the distance between sides W, W in direction parallel to the axis AA and, therefore, for correct determination of the temperature of a bar of given diameter or width the housing must be so oriented that the area of bar visible corresponds with the area upon which the calibration of the instrument is based.

It is not necessary that the sides W, W of area O' be straight lines as shown in Figs. 1 and 2; constancy of the length of rod visible to the surface S during transverse movement or vibration can be obtained by apertures whose opposite edges are not straight, but irregular or curved, so long as the distance from every point, or increment of length, of one side, to the corresponding points, or increment of length, of the other side, is constant as measured in direction parallel to the axis A—A of bar B. For example, as shown in Fig. 3, the upper and lower sides of diaphragm aperture OC which determine the length of bar B visible to surface S are curved arcs C, C of circles having the same radius and whose centers are so disposed the arcs are equidistant throughout. The other sides of the aperture of any of the modifications herein disclosed, for example *h, h* of Fig. 1, may be straight, irregular or curved and need not be equidistant throughout; they should not, however, obstruct radiation from the bar to surface S during vibration or movement of the bar. For simplicity, the simple rectangular aperture shown in Fig. 1 and other figures is preferred.

Fig. 4 is illustrative of another form of radiation detector in which the radiation-collecting element is a concave mirror CM disposed behind the radiation-receiving surface S to impress thereon radiation from a source, such as bar B, within the solid angle determined by the aperture O. Again, as in Fig. 1, the aperture O is preferably, though not necessarily, rectangular, and in any event is of such shape the length of rod B within the area O' defined by the aperture, and effective upon surface S, remains constant as the bar moves or vibrates transversely of, or has a component or components of motion or vibration transversely of, its axis A—A as indicated by arrows *a, a*; and the foregoing relation obtains whether or not the piece B at the same time be moving longitudinally in the direction of its axis A, A or in a direction having a component parallel to its axis A—A.

In the system shown in Fig. 5, which is adapted for use with a photoelectric cell receiving radiation through area S, the dimensions of area O' are defined by aperture O and area S in such a way that from any point on S there is seen a rectangular portion of O' of width equal to the width of O' and height equal to a fixed fraction of the height of O'. The upper and lower sides of the aperture O, and therefore upper and lower sides W, W of area O', are, as in Fig. 1, equidistant throughout, preferably though not necessarily straight, and are at such angular relation with respect to axis A—A of the bar or rod B whose temperature is to be measured that, throughout the range of any movement of the piece B, transverse to its axis A—A, a portion thereof of constant length of it lies within the area O'. The temperature readings taken or ascertained from the millivoltmeter VI, or equivalent, are therefore correct regardless of transverse displacement or movement of the rod within the limits previously specified.

In the modification shown in Fig. 6, the detector D3 has no diaphragm M, but the shape of the surface S is such that the area O' has sides W, W which are equidistant as measured parallel to axis A—A of rod R so that, throughout transverse movement or vibration of the rod, in direction indicated by arrows a, a, a constant length of rod, specimen or workpiece B is visible to the radiation-receiving surface. The lens L of Fig. 1, the mirror CM of Fig. 4, and the lens L¹ of Fig 6 need not be circular; for example, as shown in Fig. 6, the lens or mirror may have two straight sides substantially parallel to the axis of the rod B; the effect of so cutting off the edges of the lens or mirror is, as shown by Fig. 6, to increase the range through which the rod may move transversely of its axis A—A without affecting the amount of radiation received by surface S from the rod.

Any of the detectors of Figs. 1 to 6 is suited for measuring the temperature of rods or bars whether or not they be moving or fed lengthwise, in direction of their longitudinal axes or arrows c, as in hot rolling. Preferably the detector is used in a fixed position with respect to the work pieces B, and compensation for differences in their widths is effected by a slide 5, or equivalent, (Fig. 7) adjustably mounted upon the end of the detector housing I to obstruct to greater or lesser extent the length of the aperture O. To assist in proper setting of the aperture to measure the temperature of rods of known widths, slide 5 may be provided with a suitable scale or markings, or an index I for cooperating with a scale whose markings correspond with different widths of bars. By way of illustration, if the width of the bar whose temperature is to be measured is twice the width of the bar upon which the temperature scale of the instrument is based, then the slide 5 is so adjusted the length of bar visible to the radiation-receiving surface of the detector is reduced to one-half.

In Fig. 8 there is disclosed a generically illustrative example of an arrangement for maintaining constant the area of specimen effectively visible to the radiation-receiving element of the pyrometer notwithstanding variations in width of specimen, to insure equality of that area with the area for which the instrument was calibrated. This is effected by automatically adjusting the length of the aperture O to suit the fixed or predetermined temperature calibration of the pyrometer to the width of any bar, rod or the like, whose temperature is being measured. In the arrangement shown, the bar B passes, in either direction, between rolls 7 and 8 and in front of the aperture O of the radiation detector D generically illustrative of any of the types herein described and contemplated. The roll 8 provides a support for the bar and may be replaced by any suitable supporting or guiding structure. The gauge or feeler roll 7 is carried by arm 9 pivoted at 9a and biased, as by spring 10, toward roll 8 or equivalent; as a result the angular position of arm 9 about pivot 9a is determined by the thickness or width of the bar B as measured by the distance between rolls 7 and 8. Upon arm 9 is a pin 9b which extends through cam slot 11 in the extension 5a of the slide or shutter 5, to vary the position of the slide 5 with respect to aperture O in accordance with the angular position of arm 9, thus varying the increment of length of portion of bar B visible to the pyrometer detector as an inverse function of varying width of bar B, and so maintaining the area visible to the detector equal to the area upon which the instrument calibration is based.

In the alternative arrangement shown in Fig. 9 the same length of aperture O is used for all different widths of specimens or work pieces B, and compensation for those variations in width is effected by changing the magnitude of the current traversing the slidewire R of potentiometer network VS, generically similar to network V of Fig. 1. In the exemplary arrangement of Fig. 9, the slidewire R is included in one branch of a split-potentiometer circuit VS, comprising resistances RI, R2 and slidewires R and SW; the proportion of the total current from battery 3, or equivalent, which flows through the slidewire R is determined by the position of contact 12 along slidewire SW. For adjustment of contact 12 in accordance with variations in width of the rod B whose temperature is under measurement and which may move in either direction axially or longitudinally, it is carried by the bar 13, having guides 13a, 13a, connected to yoke 14 in which is mounted the roller 7a resting upon bar B which, in turn, is supported by roll 8a or equivalent. Thus, for bars of different thicknesses, or for different thicknesses of successive increments of bar B as fed between rolls 7a, 8a, the position of contact 12 is automatically readjusted so to vary the current through slidewire R that the temperature of B as read from scale 2 is correct notwithstanding the variations in or differences between the rod areas visible to the radiation-receiving surface of the pyrometer detector D.

In the arrangements thus far described, if the specimen or rod B moves transversely toward or away from the detector, the ratio of the visible area of the bar to the area O departs from the ratio upon which the pyrometer calibration is basesd, and some error is introduced. The arrangement shown in Fig. 10 insures correct temperature readings of the specimen B even though, in addition to its transverse movement, in direction of arrows a, a, as previously discussed, it also moves or is displaced in any other plane transverse to its longitudinal axis A—A. For example, if bar B moves transversely in direction of arrow b toward detector FD and away from detector RD, the radiation therefrom to detector FD is increased, but concurrently the radiation to the oppositely disposed detector RD is decreased and by an amount which is substantially equal to the increase to detector FD when the extent of movement is a small fraction of the total distance between the detectors or of the distance of the radiation-receiving surfaces from rod B. The sum total of the radiation jointly received by the detectors FD, RD at any given temperature of rod B therefore remains constant, for example, within 1% of movements not exceeding one-tenth of the normal distance from specimen B to point x of either detector (see Fig. 1 for example), and the constancy maintains even though the forward and backward movement as a component at any angle to the axis of alignment of the two detectors. To match the two detectors, or compensate for differences in their radiation-input voltage-output characteristics, one or both of them may be moved toward or away from the bar or angularly shifted, as previously described, until the difference of their output voltages is zero. It is sufficient to match the detectors at one temperature of bar B for correct measurement of any temperature thereof within the pyrometer's range.

For convenience, a reversing switch, RS, may be used to connect the thermocouple units of the detectors so that for one position of the switch their voltages are in opposition for matching purposes, and for the other position of switch RS the voltages are additive for measuring purposes.

Each of the detectors FD, RD is so oriented that it satisfies the relations discussed fully in connection with Figs. 1 to 6; that is, two sides W, W of its aperture are equidistant throughout to maintain constancy of visible length of rod B during its transverse vibration or movement, and the bar B throughout its transverse movement normal to its axis AA remains within the solid angles defined by the detector apertures.

When it is not feasible or convenient so to adjust the positions of the detectors, the matching of the detector characteristics may be effected by either of the arrangements exemplified by Figs. 11 and 12.

In Fig. 11 the output terminals of the two detectors FD, RD are shunted by fixed resistances R3, R4 along which are respectively adjustable the contacts 15 and 16, each to pick off a variable percentage of the total voltage drop across the associated resistance. While the switch RS is in such position, the voltages developed by the detectors are in opposition and the contacts 15 and 16 are adjusted for zero difference or balance of their voltages at the existing temperature of bar B. The switch RS is then thrown to reverse the connections to the resistors R3, R4, so that the voltages selected by the adjustment of contacts 15, 16 are additive. The sum of their voltages as measured by the millivoltmeter VI, or by a potentiometer network upon which is impressed the joint voltages of FD and RD is then correctly representative of the temperature of specimen B. It is sufficient to effect matching of the detectors at only one rod temperature to insure correct readings of any temperature, within the range of the instrument, the specimen may assume.

In the modification shown in Fig. 12, matching of the detectors is effected by so connecting resistances R3, R4 and their contacts 15, 16 that the output terminals of each detector is shunted by a variable resistance; the voltage drops across the entire resistances are in opposition for one position of switch RS during which contacts 15 and 16 are adjusted to effect their balance for one temperature of rod B and are additive when the reversing switch RS is thereafter thrown to its other position. Matching of the detectors for one temperature insures a correct reading at any other temperature the specimen may attain.

In both Figs. 11 and 12, transverse movement of bar B in the axis or parallel axes of the detectors has no material effect upon the total amount of radiation received by the detectors jointly; hence, the resultant of the output voltages of the detectors is representative of the bar temperature within high limits of accuracy notwithstanding such movement. Because of the shapes of the apertures O of the detectors, transverse movement of the bar with respect to its axis A—A does not affect the amount of radiation received by the detectors. The temperature of the bar B is, therefore, accurately determined irrespective of its substantial movement or displacement in any one or more of any number of planes intersecting in a line parallel to or identical with axis A—A.

For brevity in the appended claims, the term "rod" comprehends metal or other rods, bars, tubes, or other work pieces, or specimens, of circular, polygonal, or other cross-sections whose greatest dimensions are generally less than, and usually small as compared with, the lengths of the rods or bars.

What I claim is:

1. A radiation pyrometer system for measuring the temperature of rods comprising radiation-responsive means for producing an effect of magnitude determined by the amount of radiation received thereby, aperture-defining means for determining the field of view of said radiation-responsive means having two sides which are equidistant throughout as measured in direction parallel to the axis of a rod whose temperature is to be measured and whose other sides are so spaced the width of said field is substantially greater than the width of said rod, and means for varying the distance between said two sides as measured in the aforesaid direction as an inverse function of the rod width.

2. A radiation pyrometer system for measuring the temperature of rods comprising radiation-responsive means for producing an effect of magnitude determined by the amount of radiation received thereby, aperture-defining means for determining the field of view of said radiation-responsive means having two sides which are equidistant throughout as measured in direction parallel to the axis of a rod whose temperature is to be measured and whose other sides are so spaced the width of said field is substantially greater than the width of said rod, and means for compensating for the different widths of different rods or varying width along successively observed portions of the same rod comprising shutter structure adjustable to vary the distance between said two sides.

3. A radiation pyrometer system for measuring the temperature of rods comprising radiation-responsive means for producing an electrical effect of magnitude determined by the amount of radiation received thereby, an electrical network including said radiation-responsive means, aperture-defining means for determining the field of view of said radiation-responsive means having two sides which are equidistant throughout as measured in direction parallel to the axis of a rod whose temperature is to be measured and whose other sides are so spaced the width of said field is substantially wider than the width of said rod, and means responsive to variations in the widths of successively observed portions of a rod or of different rods for producing in said network an electrical effect compensating for said variations.

4. A radiation pyrometer for measuring the temperature of a rod comprising radiation-responsive means for producing an electrical effect of magnitude determined by the amount of radiation received thereby, a system for collecting radiation from said rod and impressing it on said responsive means comprising a diaphragm whose aperture has at least two substantially parallel sides, and means for varying the distance between said sides in direction parallel to the longitudinal axis of the rod in accordance with the width of the rod to avoid need for recalibration of the pyrometer.

5. A system for measuring the temperature of successive portions of an axially moving rod or the like comprising a radiation pyrometer having a diaphragm whose aperture has two substantially straight sides which are equidistant throughout as measured in direction parallel to the longitudinal axis of said rod, and means responsive to variations in width of said rod for inversely varying the distance between said sides.

6. A pyrometer system for measuring the temperature of successive portions longitudinally of a rod comprising a split potentiometer circuit including the radiation-responsive element of said pyrometer, and means responsive to variations in width of said rod along its length for varying the ratio of the impedance of the branches of said split circuit.

7. A system for measuring the temperature of an axially moving rod subject to vibration in any one of a number of planes intersecting in a line parallel to or identical with the longitudinal axis of said rod comprising radiation pyrometer detectors disposed on different sides of the rod, and temperature-determining means responsive to the resultant of the outputs of said detectors.

8. A system for measuring the temperature of an axially moving rod subject to vibration in any one of a number of planes intersecting in a line parallel to or identical with the longitudinal axis of said rod comprising radiation pyrometer detectors disposed on opposite sides of the rod, means for matching the outputs of said detectors, and temperature-determining means responsive to the resultant of the outputs of said detectors.

JACOB CLARENCE PETERS.